United States Patent Office 3,184,513
Patented May 18, 1965

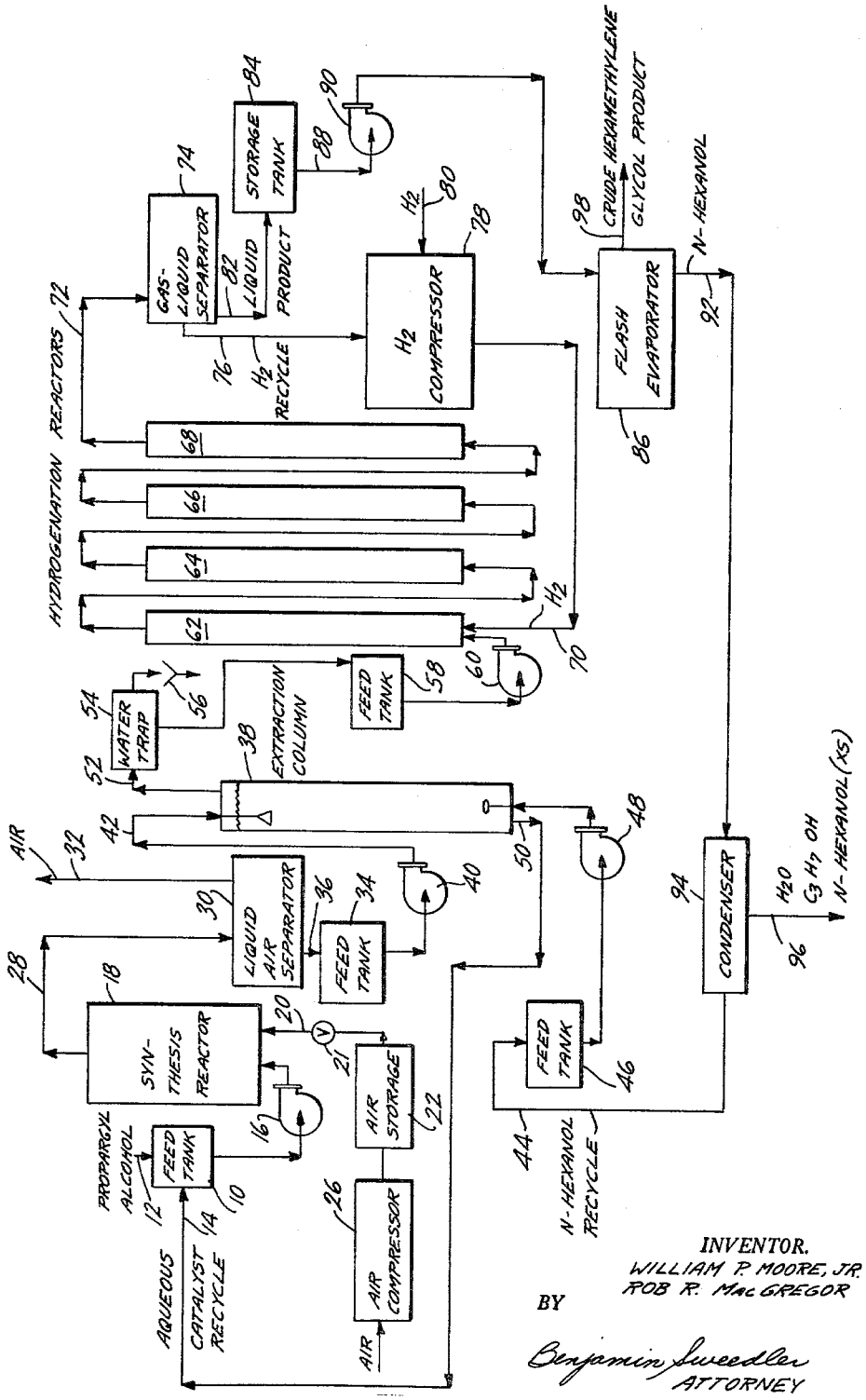

3,184,513
PRODUCTION OF HEXAMETHYLENE GLYCOL
William P. Moore, Jr., Chester, and Rob R. MacGregor, Hopewell, Va., assignors to Allied Chemical Corporation, New York, N.Y., a corporation of New York
Filed Aug. 17, 1960, Ser. No. 50,200
6 Claims. (Cl. 260—635)

This invention relates to processes for the production of hexamethylene glycol (1,6-hexanediol), an important intermediate in the production of polyurethanes, polyamides and polyester fibers, and also employed in coatings, lubricants and insect repellents. More particularly, this invention pertains to such processes involving the catalytic oxidation of propargyl alcohol to produce hexadiynediol, the recovery of the hexadiynediol from the reaction mixture in a form enabling the direction hydrogenation of the recovered material and the hydrogenation of the recovered material to produce hexamethylene glycol.

The preparation of propargyl alcohol from acetylene and formaldehyde, readily available and comparatively inexpensive reactants, is known. Also known is the conversion of propargyl alcohol to hexadiynediol (2,4-hexadiyne-1,6-diol) by oxidative coupling using aqueous cuprous chloride-ammonium chloride catalyst in the proportions of from about 2 to 5 times the amount by weight of ammonium chloride per unit weight of cuprous chloride and a molecular ratio of propargyl alcohol to cuprous chloride of from 2 to 1 to 5 to 1. The oxidative coupling reaction is disclosed, for example, on pages 121 and 122 of "Acetylene and Carbon Monoxide Chemistry," Copenhaven and Bigelow, Reinhold Company, New York, N.Y. (1949). The process disclosed in this publication involves recovery of the hexadiynediol by filtration, leaving in the filter cake the solid hexadiynediol. This results in a product highly contaminated with copper salts and chlorides, unsuitable for hydrogenation to produce hexamethylene glycol without costly purification. The copper salts poison the catalysts required for the hydrogenation reaction. Moreover, in such recovery method loss of cuprous chloride catalyst is inevitable with consequent high consumption of this catalyst in the oxidation reaction.

It has been suggested to purify the diol by recrystallization from water and to recover a second crop of diol from the filtrate by ether extraction. High temperatures required for the recrystallization cause decomposition of the hexadiynediol, even in an atmosphere of nitrogen, and such decomposition increases the losses inevitably occurring in the recrystallization procedure. Ether is a poor solvent for hexadiynediol and is hazardous to use on a plant scale.

It is among the objects of this invention to provide a relatively simple process for synthesizing hexamethylene glycol by partial oxidation of propargyl alcohol to produce hexadiynediol, extracting the hexadiynediol with a solvent to produce a solution suitable for direct hydrogenation, and hydrogenating this solution to produce hexamethylene glycol.

A further object of the invention is to provide such process which is efficient, economical to carry out, and produces the glycol in high yields.

Still another object of this invention is to provide such process in which the catalyst consumption in the oxidation step is reduced compared with heretofore known procedures and in which the solvent used for extracting the hexadiynediol is formed in the process.

Other objects and advantages of the invention will be apparent from the following detailed description thereof.

In accordance with this invention, propargyl alcohol is reacted with an oxygen containing gas in the presence of a coupling catalyst in an aqueous medium to produce an aqueous mixture containing hexadiynediol and the catalyst. The hexadiynediol is extracted from the aqueous mixture with n-hexanol to produce an n-hexanol extract containing hexadiynediol and an aqueous raffinate containing the catalyst. The n-hexanol extract is separated from the aqueous raffinate and the n-hexanol extract hydrogenated using metal hydrogenation catalysts to produce hexamethylene glycol.

Surprisingly, we have found that n-hexanol is a good solvent for hexadiynediol and effects separation of the hexadiynediol to produce a solution substantially free of catalyst poisons and which provides an eminently satisfactory medium for the hydrogenation reaction in the presence of metallic catalysts to produce good yields of hexamethylene glycol.

The oxidative coupling of the propargly alcohol is conducted in an aqueous solution containing cuprous chloride and ammonium chloride salt catalysts, with the ammonium salt on a weight basis, desirably preponderating, preferably from 2 to 5 parts by weight of ammonium chloride per part by weight of cuprous chloride. From 4 to 15 mols of propargyl alcohol is reacted per mol of cuprous chloride (CuCl). A preferred solution contains about 20% propargyl alcohol, 4.5% cuprous chloride, 11.5% ammonium chloride, the rest being water. The amount of oxygen used, desirably in the form of air, is in excess over that required for the reaction; any desired excess may be used.

The reaction may be carried out batchwise or continuously, desirably the latter. For example, the solution containing propargyl alcohol and the cuprous chloride and ammonium chloride salt catalysts is fed continuously through an air-sparged tower reactor maintained at a temperature within the range of from about 30° to 70° C., and preferably at about 50° to 60° C. The air is fed through the reactor at a space velocity within the range of from about 100 to 800 hr.$^{-1}$, preferably about 250 to 400 hr.$^{-1}$, and a pressure of from about 150–600 p.s.i.g.

The reaction is carried out to convert from about 88% to 98% of the propargyl alcohol to hexadiynediol. By so doing, only small amounts of unreacted propargyl alcohol are lost in the subsequent hexanol extraction and oxidation of cuprous catalyst ions is minimized, if not prevented. Such undesired oxidation takes place if the reaction is carried to the point where all of the propargyl alcohol is converted to hexadiynediol. In general, a reaction time of from ½ to 2 hours, preferably about 2 hours, under the reaction conditions above described, will give conversions of from 88% to 98% of the alcohol.

The reaction mixture is extracted with n-hexanol, which may be pure n-hexanol or diluted with hydrogenation products. Preferably, the reaction mixture formed in the hydrogenation of the hexadiynediol to produce hexamethylene glycol is subjected to flash evaporation to separate by-products from the hexamethylene glycol, which by-products contain chiefly n-hexanol and include small amounts of 2-hexanol, 1,3-hexanediol, 1,4-hexanediol, 2-ethyltetrahydrofuran, 2-tetrahydrofuryl ethanol and hexamethylene glycol. The n-hexanol containing small amounts of the impurities hereinabove enumerated desirably is used as the extracting medium.

The extraction may be carried out in any desired manner, preferably in a spray, packed, or spinning band column with either the n-hexanol or the reaction mixture in the dispersed phase. Hexadiynediol is more soluble in n-hexanol than in water, having a distribution coefficient between n-hexanol and water ranging from 1.8 at 25° C. to 5.5 at 60° C. and having a solubility in n-hexanol of about 40 grams per 100 grams at 60° C.

The extraction is carried out at temperatures of from 40° to 70° C. and a pressure of from 1 to 5 atmospheres absolute with the ratio of the amount of the extractant to that of the aqueous feed of from 0.25 to 1.5. Under these conditions extraction of hexadiynediol is substantially complete. Substantially all of the cuprous catalyst salts, on the other hand, remain dissolved in the aqueous raffinate which preferably is recycled to the hexadiynediol synthesis reactor. This aqueous raffinate contains a small percentage of hexadiynediol, of the order of from 0.1% to 10%. We have found, however, that tar (polymer) formation does not take place to any appreciable extent in the reactor notwithstanding the recycle of the raffinate to the synthesis reactor.

The hexadiynediol extract is hydrogenated directly by passage through a fixed bed of hydrogenation catalyst or by treatment with a slurry of the catalyst. Suitable hydrogenation catalysts are nickel, copper, Raney nickel, iron, cobalt, platinum, palladium, alloys of two or more of these metals and manganese on silica. The catalyst may be supported or unsupported. In the case of a supported catalyst, any of the usual supports such as alumina, carbon, silica gel, etc. may be used. The hydrogenation is carried out under a pressure of from 150 to 3,000 p.s.i.g. at a temperature of from 40° C. to 200° C. for a reaction time of from 1 to 10 hours. Under these conditions from 95% to 100% attack on the hexadiynediol is obtained.

The crude hexamethylene glycol thus produced contains generally from about 10% to 15% n-hexanol as a by-product. The hydrogenation reaction mixture desirably is evaporated at a temperature of from 75° C. to 200° C. under a pressure of 20 to 1000 mm. of mercury, in any suitable evaporator, such as a turbafilm evaporator, falling film evaporator, or standard tube and shell evaporator. The n-hexanol is thus separated from the crude hexamethylene glycol product and returned for reuse to the hexadiynediol extractor. The crude hexamethylene glycol may be purified by distillation.

The accompanying drawing is a flow sheet which shows, for purposes of exemplification, a preferred arrangement of equipment for practicing the process for producing hexamethylene glycol of the present invention.

In the drawing, a synthesis reactor feed tank 10 is supplied with fresh propargyl alcohol through line 12 and an aqueous catalyst recycle stream through inlet line 14. The feed tank communicates with a pump 16 which feeds the mixture of propargyl alcohol and the aqueous catalyst solution to a hexadiynediol synthesis reactor 18, preferably constructed of Hastelloy C. A line 20 having a valve 21 therein, through which line air is fed to the bottom of the synthesis reactor, communicates with an air storage tank 22; an air compressor 26 charges the storage tank.

An outlet line 28 from the synthesis reactor 18 leads to a liquid-air separator 30 for affecting separation of the effluent mixture exiting from the synthesis reactor. Air from the liquid-air separator passes through a line 32, either for recycle to the air compressor 26 or for venting. A feed tank 34 is provided, communicating with the separator 30 through an outlet line 36, for storing the liquid synthesis reaction mixture and feeding it to the subsequent extraction stage.

A pump 40 pumps the synthesis reaction mixture from the feed tank 34 to the extraction column 38 through line 42 leading into the top of the column 38. n-Hexanol is pumped into the base of extraction column 38 from feed tank 46 which communicates with the bottom of the extraction column 38 by a feed pump 48. A recycle outlet 50 receives the aqueous raffinate from the bottom of the extraction column 38 for recycle to the inlet 14 of the synthesis reactor feed tank 10.

An n-hexanol extract of hexadiynediol flows through an outlet line 52 leading from the top of the extraction column 38 into a water trap 54 provided with a drain 56 to remove water from the hexanol extract. A hydrogenation feed tank 58 communicates with the trap 54 and receives the n-hexanol extract. Pump 60 pumps this extract, through hydrogenation reactors 62, 64, 66 and 68 in series.

The hydrogenation reactors may be conventional packed columns, say of stainless steel. Each column is filled with hydrogenation catalyst, for example, of Ni, Cu, and Mn granules on silica gel or other known hydrogenation catalysts. A hydrogen recycle line 70 leads into the bottom of the first stage hydrogenation reactor 62 for bubbling hydrogen for reaction through the fixed catalyst beds as the n-hexanol extract is passed therethrough.

Outlet line 72 from the top of the fourth stage hydrogenation reactor 68 communicates with a gas-liquid separator 74. The hydrogen separated from the hydrogenation reaction mixture is fed from the separator through a vapor line 76 leading to a hydrogen compressor 78 and back through the hydrogen recycle line 70 to the hydrogenation reactors. An inlet line 80 for introducing fresh hydrogen leads into the hydrogen compressor 78.

A liquid product outlet 82 communicates with the separator 74 and a storage tank 84. The storage tank, in turn, communicates with a flash evaporator 86 through a line 88 provided with a pump 90, which feeds the liquid product to the evaporator. The flash evaporator has a vapor line 92 leading to a condenser 94 which is operated to condense the major portion of the n-hexanol, which condensate is recycled to the extraction column 38. A minor excess portion of the n-hexanol together with water, n-propanol, and other glycols and tetrahydrofurans is vented through vapor line 96. Line 98 leads from the flash evaporator 86 for withdrawal of the bottoms containing crude hexamethylene glycol product, which may thereafter be purified.

The following example is given for illustrative purposes; it will be understood the invention is not limited to this example. The example is carried out in equipment such as shown in the drawing. The units of quantity in the example are on a basis of 100 pounds liquid feed to the hexadiynediol synthesis reactor 18; it will be appreciated the flow through the equipment is continuous.

Fresh propargyl alcohol in amount of 19.5 pounds was mixed in feed tank 10 with 80.5 pounds of the aqueous catalyst recycle stream from the extraction column 38. The 100 pound feed for the synthesis reactor thus provided comprised 20.0% propargyl alcohol, 5.0% hexadiynediol, 0.6% n-hexanol, 58.4% water, 4.5% cuprous chloride and 11.5% ammonium chloride.

The liquid feed was pumped to the bottom of the synthesis reactor under a pressure of 450 p.s.i.g. and compressed air was bubbled into the bottom of the reactor through a porous sparger. The reaction was carried out at 55° C. with agitation provided by the air bubbling through the reactor at 400 hr.$^{-1}$ space velocity. After a reaction time of one hour, the effluent from the reactor was separated into an air stream for recycle and a liquid synthesis reaction mixture (101.9 lbs.) consisting of 1.2% propargyl alcohol, 23.0% hexadiynediol, 0.6% n-hexanol, 59.5% water, 4.4% cuprous chloride and 11.3% ammonium chloride.

The liquid synthesis reaction mixture was fed to the top of the extraction column 38 for hexadiynediol recovery. n-Hexanol in the amount of 73.8 pounds was sprayed into the bottom of the column operating at 60° C. and under atmospheric pressure.

The aqueous raffinate was withdrawn from the outlet 50 in amount of 80.6 pounds consisting of 0.7% propargyl alcohol, 6.2% hexadiynediol, 0.7% n-hexanol, 72.5% water, 5.6% cuprous chloride and 14.3% ammonium chloride.

The n-hexanol extract (95.2 pounds) withdrawn through the outlet line 52 had the following composition: 0.7% propargyl alcohol, 19.4% hexadiynediol, 77.5% n-hexanol, 2.4% water and trace amounts of cuprous chloride and ammonium chloride (about 2 parts per million of solution).

The n-hexanol extract was pumped to the bottom of the first stage hydrogenation reactor 62; 10 pounds of hydrogen was also pumped to the bottom of reactor 62. The four hydrogenation reactors were operated in series under a pressure of 2,000 p.s.i.g. hydrogen with the temperatures of reactors 62, 64, 66 and 68 ranging from 50° to 75° C., 75° to 90° C., 115° to 125° C., and 125° to 150° C., respectively. The reactors were filled with 8–14 mesh catalyst granules composed of 16.0% Ni, 5.0% Cu, and 0.5% Mn on silica gel. After reaction for about five hours, the effluent mixture was passed through the gas-liquid separator 74 and 8.6 pounds of hydrogen separated and recycled to reactor 62. The liquid product in amount 96.7 pounds consisted of 14.9% hexamethylene glycol, 79.0% n-hexanol, 2.5% other $C_6$ glycols and tetrahydrofuran derivatives, 0.9% n-propanol and 2.8% water.

The liquid product was flashed in the evaporator 86 operating at 50 mm. Hg abs. with overhead and bottoms temperature of 82° C. and 127° C., respectively. Cooling of the condenser 94 was regulated to allow the water, propanol and excess n-hexanol (about 2.6 pounds n-hexanol) in the overhead from the evaporator to pass from the system while the major proportion of the n-hexanol was condensed. 73.8 pounds of the n-hexanol were recovered and recycled through the hexadiynediol extractor.

The bottoms fraction from the evaporator 86, in the amount of 16.8 pounds, contained 85.0% hexamethylene glycol and 15.0% other $C_6$ glycols and tetrahydrofuran derivatives.

The 85% hexamethylene glycol content of the crude was recovered as pure fiber-grade material by vacuum fractionation for an over-all hexamethylene glycol process yield of 69.7%

Unless otherwise indicated, all percentages given in this specification are percentages by weight.

It will be noted that the present process provides an efficient and economical method for recovering hexadiynediol free from contaminants and for producing hexamethylene glycol therefrom, involving a minimum number of process steps, and minimizing solvent and catalyst consumption.

By extracting the hexadiynediol from the synthesis reaction with n-hexanol and hydrogenating the resultant solution to form hexamethylene glycol, several advantages are secured. The number of process steps and equipment is reduced by using the directly recoverable hexadiynediol extract, without subsequent purification and re-heating, for the hydrogenation procedure. The hexanol extract is substantially free of cuprous ions which adversely affect hydrogenation metal catalysts, and hence can be efficiently hydrogenated directly. The amount of hexadiynediol recycled to the synthesis reactor is small, thereby minimizing, if not eliminating, tar formation in the reactor. Moreover, catalyst and solvent consumption are decreased by recycle of the aqueous raffinate and hydrogenation by-product streams.

Since different embodiments of the invention may be made without departing from the scope thereof, it is intended that all matter contained in the above description or shown in the accompanying drawing shall be interpreted as illustrative and not in a limiting sense.

What is claimed is:

1. A process for the production of hexamethylene glycol, comprising reacting an aqueous solution containing propargyl alcohol witha free-oxygen-containing gas in the presence of cuprous chloride-ammonium chloride coupling catalyst to produce an aqueous mixture containing hexadiynediol and said catalyst, extracting the hexadiynediol from said aqueous mixture with n-hexanol to produce an n-hexanol extract containing hexadiynediol and an aqueous raffinate containing said catalyst, separating the n-hexanol extract from the aqueous raffinate and hydrogenating the hexadiynediol in said extract to produce hexamethylene glycol.

2. A process for the production of hexamethylene glycol, comprising the steps of reacting an aqueous solution containing propargyl alcohol with a free-oxygen-containing gas in the presence of cuprous chloride-ammonium chloride coupling catalyst to produce an aqueous mixture containing hexadiynediol and said catalyst, extracting the hexadiynediol from said aqueous mixture with n-hexanol to produce an n-hexanol extract containing hexadiynediol and an aqueous raffinate containing said catalyst, recycling said aqueous raffinate for reaction with additional propargyl alcohol, and hydrogenating the hexadiynediol in said n-hexanol extract in the presence of a hydrogenation catalyst to produce hexamethylene glycol.

3. A process for the production of hexamethylene glycol, comprising the steps of (1) reacting an aqueous solution containing propargyl alcohol with a free-oxygen-containing gas in the presence of cuprous chloride-ammonium chloride coupling catalyst to convert 89–98% of the propargyl alcohol to hexadiynediol; (2) extracting the hexadiynediol from the aqueous mixture resulting from step 1 with n-hexanol at a temperature of from 40° C. to 70° C. and in amount such that the ratio of n-hexanol to said aqueous mixture is within the range of from 0.25 to 1.5 to produce an n-hexanol extract containing hexadiynediol and an aqueous raffinate containing said catalyst; (3) recycling said aqueous raffinate from step 2 to step 1; and (4) hydrogenating the hexadiynediol in said n-hexanol extract in the presence of a hydrogenation catalyst to produce hexamethylene glycol.

4. The process defined in claim 3, in which n-hexanol is separated from the hexamethylene glycol produced in step 4 and is recycled to step 2.

5. A process for the production of hexamethylene glycol, comprising the steps of (1) continuously feeding an aqueous solution containing propargyl alcohol, and cuprous chloride and ammonium chloride catalyst salts and air through a reaction zone at temperatures of from 30°–70° C. and under pressures of from 150–600 p.s.i.g. to convert from 88% to 98% of said propargyl alcohol to hexadiynediol; (2) continuously extracting the reaction mixture from step 1 with n-hexanol at a temperature of from 40°–70° C. under a pressure of from 1 to 5 atmospheres and in amount such that the ratio of n-hexanol to said reaction mixture is within the range of from 0.25 to 1.5 to produce an extract of hexadiynediol in a n-hexanol solvent substantially free from catalyst impurities and an aqueous raffinate containing the catalyst salts; (3) recycling said aqueous raffinate to step 1; and (4) continuously feeding said extract through a hydrogenation zone in the presence of a hydrogenation catalyst under a pressure of from 150–3000 p.s.i.g. and a temperature of from 45°–150° C. to hydrogenate the hexadidynediol in the n-hexanol to hexamethylene glycol.

6. The process defined in claim 5, in which n-hexanol is separated from the hexamethylene glycol produced in step 4 and is recycled to step 2.

References Cited by the Examiner

UNITED STATES PATENTS 2,479,041  8/49  Elgin _____ 260—637
2,942,014  6/60  Cameron _____ 260—635
2,953,605  9/60  Hort.

OTHER REFERENCES

Laddha et al., "Ind. & Engin. Chem.," vol. 40 (1948), pages 494 to 496, TP1A 58.

Lespieu, "Comptes Rendus," vol. 150 (1910), pages 1761–1762, Q46A14.

Zalkind, Jr. Gen. Chem. (U.S.S.R.), vol. 7 (1931) pp. 227–231.

LEON ZITVER, Primary Examiner.

CHARLES B. PARKER, Examiner.